June 10, 1958 E. N. SHAWHAN 2,838,378
APPARATUS FOR MEASURING AND CONTROLLING ALKALINITY
OF NON-AQUEOUS LIQUIDS
Filed Oct. 27, 1950 2 Sheets-Sheet 1

INVENTOR.
ELBERT NEIL SHAWHAN
BY
ATTORNEYS.

INVENTOR.
ELBERT NEIL SHAWHAN
BY
ATTORNEYS.

United States Patent Office 2,838,378
Patented June 10, 1958

2,838,378

APPARATUS FOR MEASURING AND CONTROLLING ALKALINITY OF NON-AQUEOUS LIQUIDS

Elbert Neil Shawhan, Newtown Square, Pa., assignor to Sun Oil Company, Philadelphia, Pa., a corporation of New Jersey Application October 27, 1950, Serial No. 192,400

3 Claims. (Cl. 23—253)

This invention relates to an apparatus for measuring and controlling the alkalinity of non-aqueous liquids, and has particular reference to an apparatus adapted to highly viscous oily or tarry liquids which are fluent only at elevated temperatures.

The present invention is particularly applicable to the conversion of naphthenic soaps into naphthenic acids by the addition of acid to heavy oils previously treated with caustic. Oils of the type which will be particularly referred to herein are fluent so as to be susceptible to pumping only at temperatures of the order of 300° F. and upwards. In particular, the problem which will be specifically described is that of securing alkalinity within a limited range which may be best defined by the percent volume of concentrated sulfuric acid which is required to complete the neutralization. In these terms the alkalinity, for example, is to be controlled between limits of about 0.05% to 0.15%. After original caustic treatment, the oil may be more alkaline than 0.05% and the alkalinity is reduced by the addition of sulfuric acid in regulated amounts. The treatment is generally carried out by adding sulfuric acid by means of an adjustable proportioning pump which regulates the amount of acid injected on each stroke. The acid and oil are mixed by passage through a series of orifices or by intimate admixture in a mixing chamber. The reaction is a relatively slow one and intimate admixture and a substantial period of time are required for the acidifying action.

In view of the high temperatures which are involved and the non-aqueous nature of the material undergoing treatment, the usual means applicable at low temperatures to aqueous liquids are not adaptable for measurement of the degree of neutralization. It has accordingly been customary in the past to draw off samples at intervals and check these for alkalinity by a chemical titration process after the addition of suitable solvents. However, by the time the correction is ascertained there will be passed through the apparatus a considerable quantity of improperly acidified oil and, consequently, this must be diverted to storage tanks for retreatment. In extreme cases, damage to the plant may result from formation of either coke or salt crystals and corrosion by excess acids.

It is the general object of the present invention to measure and control the alkalinity in a continuous process of such nature that the alkalinity is continuously and immediately indicated so that proper steps may be taken for control with attainment directly of a product having the proper ultimate alkalinity.

In brief, the present apparatus involves the electrical determination of a component of the impedance of the liquid undergoing treatment. It has been found that if the liquid is passed through an impedance cell in such fashion as to provide a dielectric between conductors, i. e., a cell consisting of an outer metallic cylinder having an interior electrode extending axially therethrough, the reactance may be measured since it, in particular, is found to undergo a rather sudden change as the alkalinity reaches and passes through the required limits on the alkaline side of normal.

While the apparatus is particularly adapted for the treatment of oil as just described, it will be evident that it is of more general applicability in the control and measurement of alkalinity of non-aqueous liquids, particularly at elevated temperatures.

The general object just described and further objects of the invention particularly relating to details of the apparatus will become apparent from the following description read in conjunction with the accompanying drawings, in which.

Figure 3:
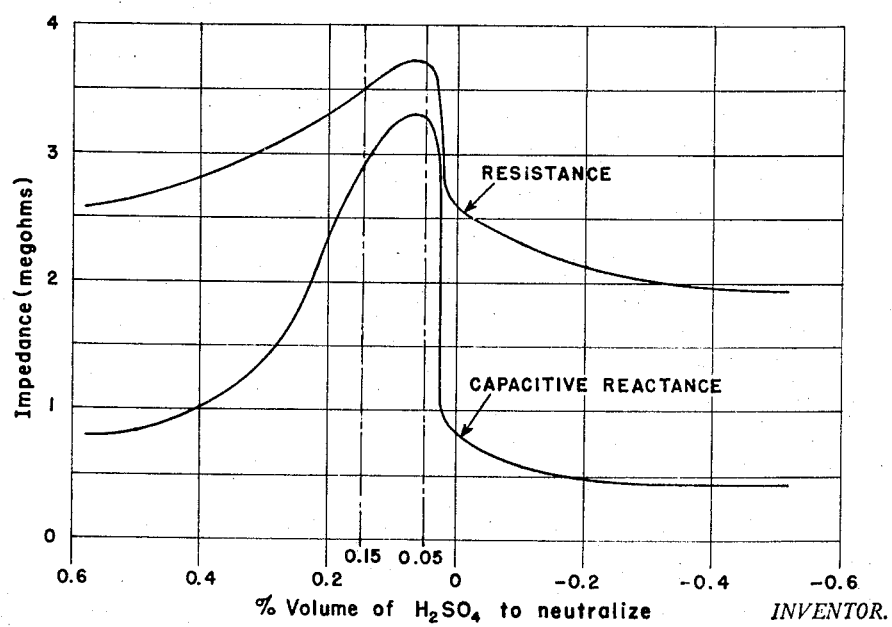
Figure 3 is a graph illustrating the changes of reactance and resistance which occur in the oil referred to in the region of desired alkalinity.

Reference may be made first to Figure 3 which plots reactance (reactive impedance) and resistance for oil of the type referred to above against the percent volume of concentrated sulfuric acid required for neutralization. The zero of the abscissae indicates the neutral point. The limits of 0.15% and 0.05% on the alkaline side of neutral are indicated by chain lines. As will be evident from the graph, the resistive component of the impedance rises from a condition of extreme alkalinity reaching a peak value in the region of 0.07%. It then drops sharply and approaches a constant value on the acid side of neutral. A similar curve represents the variations of the reactive component, or reactance, of the impedance. It will be noted that the magnitude of change of the reactive component, percentagewise, is considerably in excess of the change of the resistive component. While the change of the resistive component may be used as an indication of proper alkalinity, it is preferred to use the more critical change of the reactive component, and the apparatus hereafter described in detail shows measurements based on the changes of the reactive component. It will also be evident that the total impedance may also be used as an indication since this will vary in general similarity to the two components.

It may here be noted that the reactive component in the region of interest is capacitive; far beyond this in the regions of excessive alkalinity and of excessive acidity the reactive component passes through a zero value, becoming inductive. The latter condition particularly indicates that, despite its form, the impedance cell does not act as a condenser.

Figure 1:
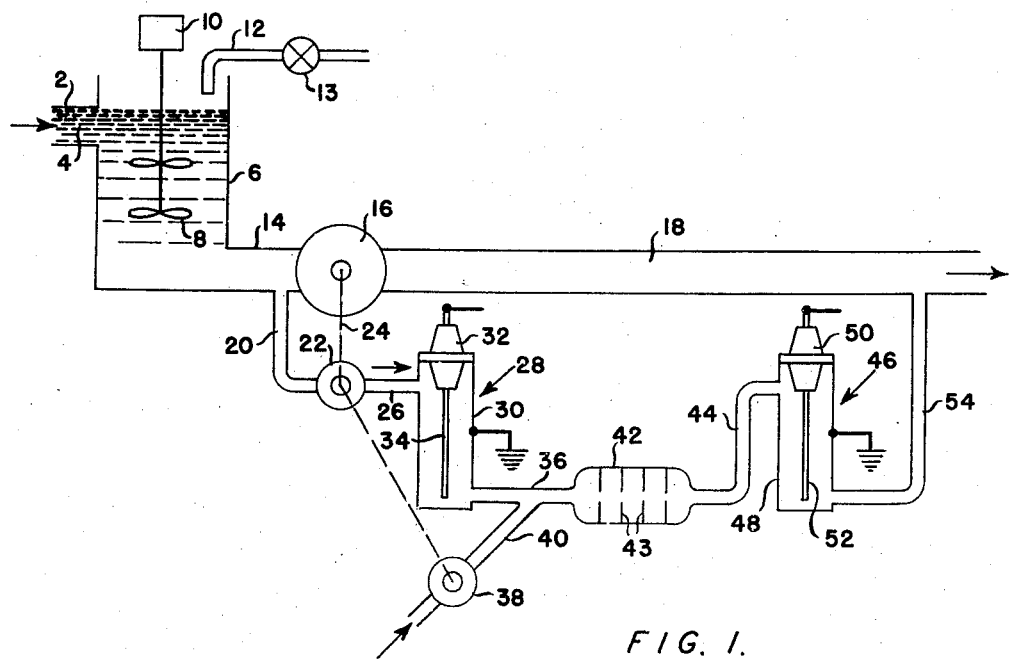
Figure 1 is a diagram illustrating one form of apparatus which may be provided in accordance with the invention.

Reference may now be made to Figure 1 which shows diagrammatically an apparatus for the treatment and measurement. While not illustrated in the diagram it will be understood that the entire apparatus, when heavy oils are being treated, will be steam jacketed in order to provide a temperature at which the oils are sufficiently fluent to be pumped and undergo admixture with sulfuric acid for the proper partial neutralization of the alkalinity.

The oil indicated at 4 is fed through a pipe 2 into a tank 6 provided with agitators indicated at 8 driven by a motor 10. Sulfuric acid is fed to the tank through a pipe 12 under suitable control which is conventionalized as a valve 13, though the control may take the form of a variable stroke feed pump to provide close control of the amount of concentrated sulfuric acid which is added. In practice furthermore, the mixing apparatus may be of other types than indicated. For example, the oil and the acid, after some preliminary mixing, may be fed through a mixing chamber including suitable baffles to promote thorough admixture and thereafter, before measurement is attempted, the mixture may be permitted to become relatively quiescent for a period of time to permit the subsiding of foam which is largely steam and gases produced by the neutralization of the alkaline content of the oil.

Following the acid treatment, the mixture is pumped from the tank in which the reaction is completed through an outlet 14 and pump 16 which delivers the product through the outlet pipe 18.

In order to provide for the measurement of the reactance a bypass flow is provided from the pipe 14 through a connection 20 to a smaller pump 22 which may be connected as indicated at 24 to the drive for the main pump 16 so as to provide a proportional flow through the bypass. The pump 22 delivers the bypass flow through connection 26 to a cell 28 in which the reactance is measured. This cell may comprise a cylindrical metallic casing indicated at 30 through the top of which there is mounted, by means of a stand-off insulator 32, a central axially located electrode 34. From the bottom of the cell a connection 36 leads the bypassed material to a mixing chamber 42 provided with baffles 43 for the purpose of producing admixture with concentrated sulfuric acid which is led through connection 40 into connection 36 under control of a small pump 38 which is desirably driven in synchronism with the pump 22 in order to provide a definite proportion between the sulfuric acid and the material flowing from the cell 30.

The mixture then flows through connection 44 to a cell 46 similar in construction to the cell 28 and comprising the cylindrical metallic outer housing 48 associated with the axially extending electrode 52 supported by insulator 50. From the cell 46 the flow enters through connection 54 the passage 18 to join the treated material flowing therein.

The portions of the cells and electrodes which are exposed to the fluid may be made of stainless steel or other suitable corrosion-resistant material.

Before proceeding to details of the electric circuitry employed, brief overall reference to the operations in accordance with Figure 1 may be made.

The cells are placed in a bypass rather than in the main conduit for two reasons, the first of which is merely the size of the cells which may be kept small if only a fraction of the flow takes places therethrough.

The second reason is associated with the use of two cells which is advantageous to a degree though not particularly important.

As will be noted by reference to Figure 3, the reactance, which it is of interest to measure, is in the form of a peak in the vicinity of the desired alkalinities. Actually, the desired range of alkalinities lies on the left side of this peak as indicated. However, it is evident that since the peak is rather sharp it would be easily possible accidentally to pass to the other side of the peak so that for a particular value of reactance the alkalinity may be either proper or too great or, on the other hand, may be too small. The purpose of using two cells is so that after passage through the first a small and definite quantity of sulfuric acid may be added to the material and the change of reactance noted by comparison of the reactances of the upstream and downstream cells. By utilizing for this purpose only a small proportion of the flow through a bypass the addition of sulfuric acid may be such as to produce a substantial change of reactance in the bypass fluid but such as would produce a negligible change in the main stream. Accordingly, if the test indicates that the main sulfuric acid addition is too great, negligible additional damage will be done through the addition of the sulfuric acid in the bypass test stream.

Figure 2:
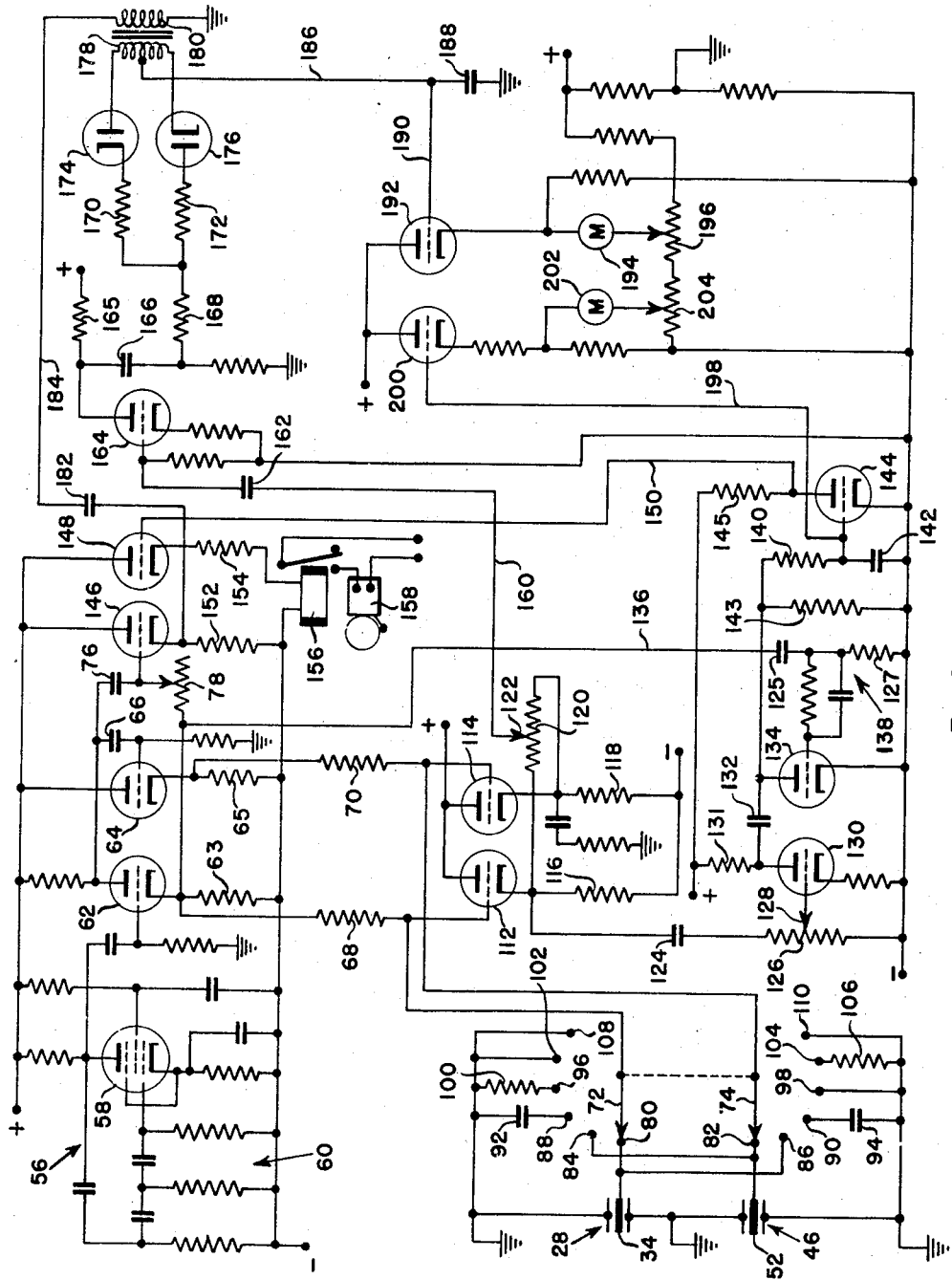
Figure 2 is a wiring diagram showing a preferred form of electrical circuit arrangement for the measurement of reactance changes and for signalling substantial departures from the desired alkalinity.

Reference may now be made to Figure 2 which shows the wiring of a satisfactory form of apparatus for the reactance measurements referred to above.

At 56 there is indicated a phase shift oscillator of conventional type including the pentode 58 and the phase shift network 60 and their usual connections. This oscillator supplies the alternating current for the reactance measurement and its frequency is not critical though it has been found that a frequency of the order of 700 cycles per second is particularly desirable consistent with convenient sizes of the electrical elements involved.

The output from the oscillator 56 is fed to the grid of the follower triode 62 which is associated in a phase inverter arrangement with a second triode 64, the anode of the triode 62 being connected to the grid of triode 64 through condenser 66. The two triodes 62 and 64 have equal cathode lead resistors 63 and 65 respectively. The cathodes of these triodes are connected through precision high resistances 68 and 70, respectively, to the arms of multiple position switches 72 and 74. A phase adjustment arrangement is provided by a condenser 76 connected to the anode of triode 62 and to an adjustable contact point of a resistor 78 which is connected to the cathode of triode 62.

One pair of contacts for the switches 72 and 74 is indicated at 80 and 82. These contact points are connected to the electrodes 34 and 52 of the upstream and downstream cells 28 and 46 respectively. As indicated in Figure 2 the cylindrical casings of these cells are grounded. A second set of contact points 84 and 86 is provided to interchange the connections of switches 72 and 74 to the electrodes 34 and 52. Contact points of another pair indicated at 88 and 90 are connected to condensers 92 and 94 which are grounded. Contact points 96 and 98 of still another set are connected, respectively, through resistance 100 to ground and directly to ground, while the contacts 102 and 104 of a further set have a reverse connection arrangement, the contact point 102 being directly grounded and the contact point 104 being connected to ground through resistance 106 which is equal to resistance 100. The last contact points 108 and 110 are both grounded serving to provide direct ground for the switch arms. The contact points 80 and 82 are the working points though if desired 84 and 86 may, under some circumstances, be used. The remaining switch positions are solely for balance of the circuit, permitting various adjustments to be made to secure the best conditions for operation. They may be disregarded in the further discussion.

The potentials appearing at the switch arms 72 and 74 are respectively applied to the grids of triodes 112 and 114 which are arranged in cathode follower arrangements including the cathode load resistors 116 and 118.

A potentiometer resistance 120 is connected between the cathodes of these tubes, the contact of this potentiometer being indicated at 122.

The cathode of triode 112 is connected through condenser 124 to one end of a potentiometer resistance 126 the other end of which is grounded. The contact 128 of this potentiometer is connected to the grid of a triode 130 provided with an anode load resistor 131. The anode of triode 130 is connected through condenser 132 to the anode of a triode 134 the cathode of which is grounded. The grid of triode 134 is connected through line 136, condenser 125 and a resistance-capacitance network 138 to the cathode of triode 62. The anode of triode 134 is connected to the series arrangement of resistance 140 and condenser 142 and through these to ground. The anode of triode 134 is also connected to ground through the high resistance 143.

The junction of resistance 140 and condenser 142 is connected to the grid of triode 144 provided with a load resistor 145. A pair of triodes 146 and 148 have their anodes connected to the positive potential supply line and their grids respectively connected to the variable contact of resistor 78 and through connection 150 to the anode of triode 144. Cathode resistors 152 and 154 are connected to the terminals of the coil of a relay 156 which, when energized, is adapted to ring a bell 158 or operate some other suitable alarm.

The potentiometer contact 122 is connected through line 160 and condenser 162 to the grid of a triode 164 which is provided with an anode load resistor 165 to which is connected at the anode the condenser 166 arranged to supply a signal through the high resistance 168 to the branched arrangement of equal resistors 170 and 172 connected respectively to the cathode of diode 174 and to the anode of diode 176. The anode of diode 174 and the cathode of diode 176 are connected to the outer terminals of a transformer secondary 178 the primary of which transformer, indicated at 180, is grounded at one end and connected at its other end through condenser 182 to the cathode of triode 146. The center tap of secondary 178 is connected at 186 to one terminal of a condenser 188 of high capacity, the other terminal of which is grounded. It is also connected, as indicated at 190, to the grid of triode 192 the cathode of which is connected to a meter 194 which is in turn connected to the variable contact of a zeroizing potentiometer 196.

The ungrounded terminal of condenser 142 is connected through line 198 to the grid of a triode 200 the cathode of which is connected to one terminal of a meter 202, the other terminal of which is connected to to the variable contact of zeroizing potentiometer 204.

It may at this time be mentioned that the meters 194 and 202 are respectively responsive to the difference of reactance of the two cells and to the reactance of the upstream cell.

The operation of the electrical circuit may now be described.

As indicated heretofore, the oscillator 56 supplies current through resistances 68 and 70 from the cathodes of triode 62 and 64 to the contact points 80 and 82 during normal operation, which contact points are respectively connected to the upstream and downstream cell electrodes 34 and 52. First, consideration will be given to the matter of measurement of reactance of the material in the upstream cell.

As will be evident from the diagram, the potential appearing between the electrode 34 and ground will be applied to the cathode follower tube 112 and, in turn, a corresponding signal will be delivered through the arrangement of condenser 124 and potentiometer 126 to the grid of triode 130. At the same time, it will be noted that the potential at the cathode of triode 62 is applied through connection 136 to the grid of triode 134 through the arrangement of the condenser 125 and resistance 127 corresponding to 124 and 126, respectively, in addition to the resistance-capacitance network provided at 138. The arrangement thus provided is a synchronous rectifier arrangement providing an output which is variable with the reactance appearing at the cell. The ultimate signal appears as a potential charging the condenser 142.

The action of this synchronous rectifier arrangement may be briefly and generally indicated as follows:

The synchronizing potential appears at the grid of triode 134. As will be evident from the circuit arrangements, the potential at this grid varies about ground potential. When the grid potential is positive, the triode 134 becomes highly conducting and, in effect, the right hand side of condenser 132 is grounded. On the other hand, when the potential of the grid of triode 134 is negative, the triode is cut off and, in effect, acts as an insulator so that the right hand side of condenser 132 is solely connected to ground through resistance 143 and the series arrangement of resistance 140 and condenser 142. Assume now that potentials 180° out of phase are applied to the grids of triodes 130 and 134 respectively, as would be the case if connections were open to the electrodes 34 and 52, i. e., the switch arms 72 and 74 were in open position. Under these circumstances, assume a half cycle during which the grid of triode 134 was positive and the grid of triode 130 consequently negative. Triode 130 would be then cut off and the potential appearing at its anode would be maximum, the potential of the positive supply line. At the same time, however, the triode 134 would, in effect, be short circuited so that this potential would not be applied to the ungrounded side of condenser 142. On the other hand, assume the grid of triode 134 negative. This triode is then cut off and the condenser 132 is ungrounded and capable of applying a potential to the ungrounded side of condenser 142. On the other hand, triode 130 will be conducting and, consequently, its anode will be at relatively low potential. The result would therefore be a low potential applied to the ungrounded side of condenser 142 representing, in effect, a zero value.

In contrast with this, if the potential at the grid of triode 112 is shifted in phase by the presence the impedance offered at the cell 28, a shift of phase occurs away from the 180° out of phase condition just mentioned, with the result that rectification of a part of the signal wave applied to the grid of triode 130 will occur giving rise to a change of potential of the condenser 142 which is a measure of the phase shift and, consequently, of the reactance appearing at the upstream cell.

By reason of the connection 198 of condenser 142 to the grid of triode 200, a direct current amplifier is provided which will give a reading on the meter 202 which is a measurement of the reactance at the upstream cell. The potential of the ungrounded side of condenser 142 varies in the positive direction with increase of capacitive reactance.

The increase of potential just mentioned is applied to the grid of triode 144 and appears as a negative change in the connection 150 to the grid of triode 148. In other words, an increase in reactance produces a diminution of the conductivity of tube 148. As will be evident from Figure 3, if operation is occurring in the proper range of alkalinity, it would generally be a diminution of reactance which would be most detrimental. Since this would increase the current through the relay coil 156, the signal would be sounded to give warning of the undue drop of reactance.

The operations so far described with reference to indication of the reactance at the upstream cell together with signalling in the event that this reactance abnormally drops is frequently sufficient in most cases for proper operation of the plant, without consideration of the downstream cell which may be omitted altogether. In the case of manual operation, the operator watching the reactance value by, for example, using a recording meter at 202 will be assured of being on the left hand side of the peak so long as the indicated reactance does not rise to the peak value. If that should happen to occur, the reactance value could drop to a proper figure either on the right or left hand side of the reactance peak. But if the operator has any doubt as to which side is involved he need only increase slightly and temporarily the sulfuric acid addition whereupon a rise of reactance will indicate that operation is occurring on the left hand side of the peak, whereas, if the reactance drops the operator will know that the operation is occurring on the right hand side of the peak and correction may be made accordingly to bring the operation into the desired range to the left of the peak.

The circuit as illustrated, however, is more complicated and permits an indication continuously as to which side of the peak is involved. The triodes 112 and 114, it will be noted, are connected to the terminals of potentiometer resistance 120, and if their inputs are 180° out of phase it will be evident that there will be no net output through contact 122 if the arrangement is initially balanced.

If, on the other hand, unequal reactances appear at the two cells, a net signal will be transmitted to the amplifier tube 164 and thence to the synchronous rectifier arrangement including the diodes 174 and 176 to produce a signal output charging the condenser 188 to a potential depending upon the sign of the difference of the two reactances, which potential will in turn be indicated by the meter 194. The synchronous rectification occurs in the system just described since, as will appear, primary 180 of the transformer is energized by the output from the cathode of triode 146, the input to which is subjected to phase shift for initial adjustment by the arrangement of condenser 76 and variable resistance 78.

As will be now evident if both meters are used the meter 202 will measure the reactance of the upstream cell while the meter 194 will indicate whether the addition of a small amount of sulfuric acid at 40 increases or decreases the reactance of the downstream cell and thus indicates whether operation is occurring on the left hand or right hand side of the reactance peak.

It will be evident that with suitable phasing changes the entire circuit described may be easily adapted to operate in response to the peak of the resistance component of the impedance or impedances of the cell arrangement. However, as indicated above, the percentage change of resistance is substantially less than the percentage change of reactance in the instance primarily under consideration. It will also be evident that the total impedances may be involved in the indications if desired. In all cases, the degree of alkalinity may be measured continuously and in spite of the high temperatures which may be involved. Since the measurements are made without substantial time lags, except for that inherent in the slow neutralization process, there will be a minimum of improperly treated material leaving the apparatus with avoidance of undesirable effects.

While sulfuric acid has been specifically referred to for neutralization, it will be evident that other acids could be used depending upon the material being treated and the results desired.

What is claimed is:

1. Apparatus for determining the alkalinity of a non-aqueous liquid, comprising means providing conductive plates, means providing a sample of the liquid between said plates to act as a dielectric therebetween, means providing an alternating current source, means applying an alternating potential derived from said source between said plates, and means including a synchronous rectifying device connected to the cell consisting of said plates and the liquid therebetween and to said alternating current source for providing an output signal as a measure of an impedance, having a reactive component, presented between said plates.

2. Apparatus for determining the alkalinity of a non-aqueous liquid, comprising means providing conductive plates, means providing a sample of the liquid between said plates to act as a dielectric therebetween, means providing an alternating current source, means applying an alternating potential derived from said source between said plates, and means including a synchronous rectifying device connected to the cell consisting of said plates and the liquid therebetween and to said alternating current source for providing an output signal as a measure of the reactance presented between said plates.

3. Apparatus for determining the alkalinity of a non-aqueous liquid, comprising a cell including means providing conductive plates, means directing the liquid between said plates to act as a dielectric therebetween, means providing an alternating current source, means applying an alternating potential derived from said source across said plates, and means including a synchronous rectifier responsive to said potential and to a synchronizing wave derived from said source for indicating an impedance of the cell.

References Cited in the file of this patent

UNITED STATES PATENTS

| | | |
|---|---|---|
| 1,450,023 | Edelman | Mar. 27, 1923 |
| 1,960,168 | Schoenberg | May 22, 1934 |
| 1,976,904 | Terman | Oct. 16, 1934 |
| 2,071,607 | Bjorndal | Feb. 23, 1937 |
| 2,171,809 | Spence | Sept. 5, 1939 |
| 2,296,867 | Osborne | Sept. 29, 1942 |
| 2,535,027 | Anderson | Dec. 26, 1950 |
| 2,599,583 | Robinson et al. | June 10, 1952 |
| 2,607,828 | Razek | Aug. 19, 1952 |
| 2,623,928 | Bower | Dec. 30, 1952 |

FOREIGN PATENTS

| | | |
|---|---|---|
| 559,240 | Great Britain | Feb. 10, 1944 |

OTHER REFERENCES

Kolthoff, "Conductometric Titrations," I. and E. Chem., and Ed., vol. 2, No. 3, July 1930, pages 225–230.

UNITED STATES PATENT OFFICE

CERTIFICATE OF CORRECTION

Patent No. 2,838,378　　　　　　　　　　　　June 10, 1958

Elbert Neil Shawhan

It is hereby certified that error appears in the above numbered patent requiring correction and that the said Letters Patent should read as corrected below.

In the grant, line 1, and in the heading to the printed specification, line 4, name of inventor, for "Elbert Neil Shawham", each occurrence, read --- Elbert Neil Shawhan ---.

Signed and sealed this 21st day of October 1958.

(SEAL)
Attest:

KARL H. AXLINE
Attesting Officer

ROBERT C. WATSON
Commissioner of Patents